United States Patent Office 3,484,481
Patented Dec. 16, 1969

3,484,481
3-AMINO-2,4,6-TRIIODOBENZOIC ACID DERIVATIVES
Werner Obendorf and Irmgard Lindner, Linz (Danube), Austria, assignors to Osterreichische Stickstoffwerke Aktiengesellschaft, Linz (Danube), Austria
No Drawing. Filed Mar. 28, 1966, Ser. No. 537,714
Claims priority, application Austria, Apr. 9, 1965,
A 3,278/65, A 3,279/65
Int. Cl. C07c *103/84, 103/28;* A61k *27/08*
U.S. Cl. 260—518                                    11 Claims

ABSTRACT OF THE DISCLOSURE

Derivatives of 3-amino-2,4,6-triiodobenzoic acid having utility as X-ray contrast agents which are of the formula

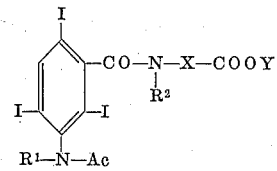

in which Ac is an acyl residue of an alkanoic acid having up to four carbon atoms, $R^1$ is selected from the group consisting of lower alkyl and alkenyl having 3 or 4 carbon atoms, $R^2$ is selected from the group consisting of hydrogen, alkyl and isoalkyl having up to four carbon atoms, alkenyl having 3 or 4 carbon atoms, ω-alkoxyalkyl having 3 or 4 carbon atoms, benzyl and α-furanomethyl, X is selected from the group consisting of methylene, ethylene, α-methylethylene and β-methylethylene and Y is selected from the group consisting of hydrogen, methyl, ethyl and a residue of a non-toxic inorganic or organic base.

---

The present invention relates to derivatives of 3-amino-2,4,6-triiodobenzoic acid, which are valuable X-ray contrast agents, and which are particularly suitable for oral cholecystography. The invention also relates to an advantageous process for the preparation of 3-amino-2,4,6-triiodobenzoic acid derivatives.

In accordance with the invention there is provided a 3-amino-2,4,6-triiodobenzoic acid derivative having the formula

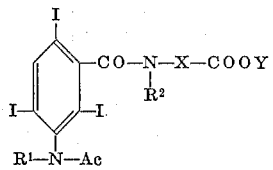

in which Ac is an acyl residue of an aliphatic mono carboxylic acid having up to 4 carbon atoms, $R^1$ is a lower alkyl group or an alkenyl group having 3 or 4 carbon atoms, $R^2$ is a hydrogen atom, an alkyl or isoalkyl group having up to 4 carbon atoms, an alkenyl group having 3 or 4 carbon atoms, an ω-alkoxy-alkyl group having 3 or 4 carbon atoms, or a benzyl or α-furanomethyl group, X is a methylene, ethylene, α-methylethylene or β-methylethylene group and Y is a hydrogen atom, a methyl or ethyl group or a residue of a non-toxic inorganic or organic base.

Examples of preferred compounds of the invention are β-aminopropionic acid and β-amino-α-methyl-propionic acid derivatives of Formula I, in which Ac is an acetyl or propionyl group, $R^1$ is a methyl, ethyl or allyl group and $R^2$ is a methyl, ethyl, propyl, allyl or γ-methoxy-propyl radical.

Compounds of Formula I are suitable above all for showing up the ball bladder system in radiographic examination. They are particularly distinguished by being rapidly and completely resorbed from the gut and rapidly excreted through the gall bladder, thus leaving very high concentrations of iodine in the gall bladder. Thus, for example, with the compound N-(3-N'-acetyl-N'-methylamino-2,4,6-triiodobenzoyl) - N - allyl-β-amino-α-methyl propionic acid sodium salt, in tests carried out with cats, visible pictures of the gall bladder could be obtained within one to two hours after oral administration and optimum quality pictures were obtainable 3 hours after administration. The gall bladder is likewise shown up quickly, for example, by administering the following compounds:

N - (3-N'-acetyl-N'-methylamino-2,4,6-triiodobenzoyl)-N-allyl-β-aminopropionic acid sodium salt,
N-(3-N'-propionyl-N'-ethylamino - 2,4,6 - triiodobenzoyl-N-γ'-methoxy-propyl - β - aminopropionic acid sodium salt,
N-(3-N'-acetyl-N'-allylamino - 2,4,6 - triiodobenzoyl)-N-methyl-β-amino-propionic acid sodium salt, and
N-(3-N'-acetyl-N'-allyl-amino - 2,4,6 - triiodobenzoyl)-N-ethyl-β-aminopropionic acid sodium salt.

The compounds surprisingly possess a low toxicity favourable for oral gall bladder contrast agents. The acute $LD_{50}$ i.v. (for white mice) of the compound N-(3-N' - acetyl-N'-methylamino-2,4,6-triiodcbenzoyl)-N-allyl-β-amino-α-methylpropionic acid is 0.93 (0.82–1.07); that of the compound N-(3-N'-acetyl-N'-allylamino-2,4,6-triiodobenzoyl)-N-methyl-β-amino-propionic acid is in fact only 1.66 (1.50–1.83).

The compounds of Formula I are thus suitable for use in rapid cholecystography following oral administration. Accordingly, the invention also provides an X-ray contrast agent comprising, as the active ingredient a compound having the Formula I herein in admixture with an inert solid or liquid filler or diluent. The compounds are preferably used in the form of their salts, for example the sodium, methylglucamine and diethanolamine salts, which may be administered in the form of pills or capsules.

The compounds of Formula I are related, from the structural point of view, to the compounds disclosed in United States Patent No. 3,051,745 to Obendorf and in the copending application Ser. No. 170,823, now Patent No. 3,334,134 to Obendorf et al. and represent an improvement in these older, related compounds. They differ from the compounds disclosed in U.S.P. 3,051,745, in that two substituents are present in the amino group situated in the 3-position of the phenyl ring. As regards the compounds of the copending application Ser. No. 170,823, they differ from the latter in that they have not only an acyl group but also an alkyl or alkenyl group on the amino group in the 3-position. The introduction of the alkyl and alkenyl groups greatly alters the properties of the compounds. Whilst the compounds according to Ser. No. 170,823 are not resorbed or are only resorbed to a limited extent in the gut, although they give good pictures of the gall bladder after intravenous administration and possess very low toxicities, the compounds of the present invention are distinguished in effect by being rapidly resorbed from the gut and rapidly excreted, after oral administration. The compounds according to U.S.P. 3,051,-745, although likewise oral gall bladder X-ray contrast agents, are taken up and excreted more slowly, so that optimum pictures can be obtained only more than 12 hours after administration and generally 14 hours following administration, which is usually the case with oral gall bladder X-ray contrast agents.

The present invention further provides a process for preparing a compound having the Formula I which comprises reacting an acid chloride having the formula:

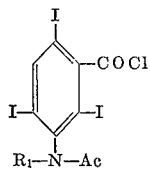

in which $R^1$ and Ac are defined above, at an elevated temperature, with an amino acid ester having the formula:

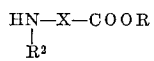

in which R is a lower alkyl group and $R^2$ and X are as defined above, and, if desired, thereafter saponifying the ester group. From the saponification solution compounds of Formula I can be obtained directly as acids or salts.

The reaction is preferably carried out in an inert organic solvent, for example, chloroform, acetone, dioxane, tetrahydrofuran, methylethyl ketone, chlorobenzene or toluene. It is however also possible to carry out the operation without using a solvent. The separation of the compounds of Formula I can be effected by evaporating the solution, which has been purified by various washing procedures, and the ester vapourisation residue is generally saponified directly. If the organic solvent used for the reaction is miscible with water, it must be evaporated after the reaction is completed and replaced by a water-immiscible solvent, prior to commencing the washing process. The saponification process is preferably an alkaline saponification process, for example, aqueous or acoholic sodium or potassium hydroxide solution may be employed, and generally heating is carried out for a short period. The alkali metal salts can either be obtained directly from the alkaline saponification solution, e.g. by precipitation with an organic solvent, or the solution is acidified and compounds of Formula I are separated out in the form of the free acid. The acids and the salts can be converted into one another.

The new acid chloride of Formula II which is used as a starting material in the above process can be obtained either by alkylation of 3-acylamino-2,4,6-triiodobenzoyl chloride with an alkylating agent, such as an alkyl halide or a dialkyl sulphate, or by reacting N-alkyl-N-acyl-2,4,6-triiodobenzoic acid with thionyl chloride, preferably in an inert organic medium.

The compounds of Formula I exist in part in two geometrically isomeric forms which can be separated from one another in principle.

The process of the invention is illustrated in the following examples.

EXAMPLE 1

18.45 g. of 3 - N-allyl-N-acetyl-2,4,6 - triiodobenzoyl chloride are dissolved in 30 ml. of chloroform and treated with 8 g. of β-amino propionic acid ethyl ester. When the reaction has subsided the mixture is boiled for another hour under reflux; it is then cooled and the solution diluted with chloroform. After washing the latter with dilute hydrochloric acid, water, sodium bicarbonate solution and more water, the chloroform solution is dried and evaporated. The vaporisation residue is dissolved in alcohol, and after adding 50 ml. 1 N caustic soda is again heated to boiling for 10 minutes. The alkaline solution thus obtained is then diluted with water, filtered over charcoal and acidified with hydrochloric acid to a pH of 1, whereby the crude acid precipitates out and is recrystallised from ethyl acetate. There is obtained 13.5 g. of N-(3-N'-acetyl-N'-allyl amino-2,4,6 - triiodobenzoyl)-β-aminopropionic acid having a M. Pt. of 187° to 193° C., corresponding to a yield of 67.5% of theory. This acid can be converted into the sodium salt by treating with the equivalent amount of aqueous sodium hydroxide.

EXAMPLE 2

23.56 g. of 3-N-methyl-N-acetyl-2,4,6 - triiodobenzoyl chloride are dissolved in 60 ml. pure chloroform and are treated with 15.3 g. of N-α'-furanomethyl-β-aminopropionic acid methyl ester (obtained by reacting α-furanomethyl-amine with methyl acrylate). After the reaction has subsided the mixture is boiled for a further 2 hours under reflux. The solution is then diluted with about 200 ml. chloroform and thereafter washed with dilute hydrochloric acid, water, sodium bicarbonate solution and more water. After drying the chloroform is evaporated off and the vapourisation residue is saponified by heating with an excess of caustic soda solution in methanol. The crude acid precipitates out on acidification and is recrystallised from ethyl acetate. There are obtained 24.1 g. of N-(3-N'-acetyl-N'-methylamino-2,4,6-triiodobenzoyl)-N'-α'-furanomethyl - β - aminopropionic acid having a M. Pt. of 150° to 156° C., corresponding to a yield of 86% of theory.

The acid chloride used as starting material is obtained as follows:

57.5 g. of N-acetylamino-2,4,6-triiodobenzoyl chloride are dissolved in 500 ml. of dioxane, 26 g. of dimethyl sulphate are added and this is followed by dropwise adition of 100 ml. 4 N caustic soda at 5° C. during a period of 30 minutes. The resulting emulsion was stirred for 30 minutes at room temperature and subsequently 800 ml. of ether were poured on top of the solution, this resulting in the formation of two layers. The lighter layer was extracted with sodium bicarbonate solution and dried with sodium sulphate. On concentrating the solution thus dried 3-N-methyl-N-acetylamino - 2,4,6 - triiodobenzoyl chloride crystallises out, M. Pt. 183° to 190° C. After recrystallisation from acetone it has a M. Pt. of 186° to 192° C.

The following acid chlorides may be obtained in a similar manner:

3-N-acetyl-N-allylamino-2,4,6-triiodobenzoyl chloride, M. pt. 124° to 126° C.
3-N-acetyl-N-methylamino-2,4,6 - triiodobenzoyl chloride, M. Pt. 186° to 190° C.
3-N-propionyl-N-methylamino-2,4,6-triiodobenzoyl chloride, M. Pt. 158° to 166° C.

The following compounds may be prepared in a similar manner to that described in Examples 1 and 2.

N-(3-N'-acetyl-N'-methylamino-2,4,6-triiodobenzoyl)-amino acetic acid, M. Pt. 250° to 256° C.,
N-(3-N'-acetyl-N'-methylamino-2,4,6-triiodobenzoyl)-N-allylaminoacetic acid, M. Pt. 190° to 195° C.,
N-(3-N'-acetyl-N'-methylamino-2,4,6-triiodobenzoyl)-N-methyl-β-aminopropionic acid, M. Pt. 165° to 175° C.,
N-(3-N'-acetyl-N'-methylamino-2,4,6-triiodobenzoyl)-N-n-propyl-β-aminopropionic acid, M. Pt. 203° to 210° C.,
N-(3-N'-acetyl-N'-methylamino-2,4,6-triiodobenzoyl)-N-3-methoxy-propyl-β-aminopropionic acid, M. Pt. 111° to 139° C.,
N-(3-N'-acetyl-N'-methylamino-2,4,6-triiodobenzoyl)-N-allyl-β-aminopropionic acid, M. Pt. 218° to 222° C.,
N-(3-N'-acetyl-N'-methylamino-2,4,6-triiodobenzoyl)-N-n-propyl-β-aminobutyric acid, M. Pt. 152° to 160° C.,
N-(3-N'-acetyl-N'-methylamino-2,4,6-triiodobenzoyl)-N-3-methoxypropyl-β-aminobutyric acid, M. Pt., 165° to 175° C.,
N-(3-N'-acetyl-N'-ethylamino-2,4,6-triiodobenzoyl)-N-n-propyl-β-amino-α-methylpropionic acid, M. Pt. 170° to 178° C.,
N-(3-N'-acetyl-N'-methylamino-2,4,6-triiodobenzoyl)-N-n-propyl-β-amino-α-methylpropionic acid M. Pt. 178° to 186° C., N-(3-N'-acetyl-N'-methylamino-2,4,6-triiodobenzoyl)-
 N-isopropyl-β-amino-α-methylpropionic acid, M. Pt.
 190° to 198° C.,
N-(3-N'-acetyl-N'-methylamino-2,4,6-triiodobenzoyl)-
 N-allyl-β-amino-α-methylpropionic acid, M. Pt. 189°
 to 202° C.,
N-(3-N'-acetyl-N'-ethylamino-2,4,6-triiodobenzoyl)-
 aminoacetic acid, Mt. Pt. 245° to 253° C., N-(3-N'-acetyl-N'-ethylamino-2,4,6-triiodobenzoyl)-
 N-allylamino acetic acid, M. Pt. 190° to 198° C.,
N-(3-N'-acetyl-N'-ethylamino-2,4,6-triiodobenzoyl)-
 N-methyl-β-aminopropionic acid, M. Pt. amorph.,
N-(3-N'-acetyl-N'-ethylamino-2,4,6-triiodobenzoyl)-
 N-n-propyl-β-aminopropionic acid, M. Pt. 186° to 194°
 C.
N-(3-N'-acetyl-N'-ethylamino-2,4,6-triiodobenzoyl)-
 N-isopropyl-β-amino-α-methylpropionic acid,
 M. Pt. 166° to 172° C.,
N-(3-N'-acetyl-N'-ethylamino-2,4,6-triiodobenzoyl)-
 N-allyl-β-amino-α-methylpropionic acid, M.
 Pt. 182° to 191° C.,
N-(3-N'-propionyl-N'-methylamino-2,4,6-triiodo-
 benzoyl)-N-3-methoxypropyl-β-aminopropionic
 acid, M. pt. 137° to 142° C.,
N-(3-N'-propionyl-N'-methylamino-2,4,6-triiodoben-
 zoyl)-N-3-methoxypropyl-β-aminopropionic acid,
 M. Pt. 150° to 154° C.,
N-(3-N'-propionyl-N'-ethylamino-2,4,6-triiodoben-
 zoyl)-N-3-methoxypropyl-β-aminopropionic
 acid, M. Pt. 158° to 162° C.,
N-(3-N'-propionyl-N'-n-propylamino-2,4,6-triiodoben-
 zoyl)-N-3-methoxypropyl-β-aminopropionic
 acid, M. Pt. 148° to 151° C.,
N-(3-N'-acetyl-N'-allylamino-2,4,6-triiodobenzoyl)-N-
 allylamino acetic acid, M. Pt. 190° to 195° C.,
N-(3-N'-acetyl-N'-allylamino-2,4,6-triiodobenzoyl)-
 N-allyl-β-aminopropionic acid, M. Pt. 147° to
 152° C.,
N-(3-N'-acetyl-N'-allylamino-2,4,6-triiodobenzoyl)-
 aminoacetic acid, M. Pt. 185° to 189° C.,
N-(3-N'-acetyl-N'-methylamino-2,4,6-triiodobenzoyl)-
 β-aminopropionic acid, M. Pt. 132° to 158° C.,
N-(3-N'-acetyl-N'-ethylamino-2,4,6-triiodobenzoyl)-
 β-aminopropionic acid, M. Pt. 126° to 137° C.,
N-(3-N'-acetyl-N'-n-propylamino-2,4,6-triiodobenzoyl)
 β-aminopropionic acid, M. Pt. 125° to 134° C.,
N-(3-N'-acetyl-N'-ethylamino-2,4,6-triiodobenzoyl)-N-
 allyl-β-aminopropionic acid, M. Pt. 179° to 183° C.,
N-(3-N'-acetyl-N'-allylamino-2,4,6-triiodobenzoyl)-N-
 methyl-β-aminopropionic acid, M. Pt. 115° C.,
N-(3-N'-acetyl-N'-allylamino-2,4,6-triiodobenzoyl)-N-
 ethyl-β-aminopropionic acid, M. Pt. 92° to 102° C.,
N-(3-N'-acetyl-N'-allylamino-2,4,6-triiodobenzoyl)-N-
 n-propyl-β-aminopropionic acid, M. Pt. 169° to
 171° C.,
N-(3-N'-acetyl-N'-allylamino-2,4,6-triiodobenzoyl)-N-
 3-methoxypropyl-β-aminopropionic acid, M. Pt. 63°
 to 67° C.,
N-(3-N'-acetyl-N'-allylamino-2,4,6-triiodobenzoyl)-N-
 α-furanomethyl-β-aminopropionic acid, M. Pt. 155°
 to 159° C.,
N-(3-N'-acetyl-N'-methylamino-2,4,6-triiodobenzoyl)-β-
 amino-α-methylpropionic acid, M. Pt. 138° to 146° C.,
N-(3-N'-acetyl-N'-ethylamino-2,4,6-triiodobenzoyl)-β-
 amino-α-methylpropionic acid, M. Pt. 174° to
 178° C.,
N-(3-N'-acetyl-N'-allylamino-2,4,6-triiodobenzoyl)-
 β-amino-α-methylpropionic acid, M. Pt. 195°
 to 200° C.,
N-(3-N'-acetyl-N'-methylamino-2,4,6-triiodoben-
 zoyl)-N-benzyl-β-amino-α-methylpropionic acid, M.
 Pt. 120° to 125° C.,
N-(3-N'-propionyl-N'-methylamino-2,4,6-triiodoben-
 zoyl)-β-aminopropionic acid, M. Pt. 120° to 130° C.

N-(3-N'-propionyl-N'-ethylamino-2,4,6-triiodoben-
 zoyl)-β-aminopropionic acid, M. Pt. 120° to 135° C.
N-(3-N'-propionyl-N'-methylamino-2,4,6-triiodoben-
 zoyl)-N-ethyl-β-aminopropionic acid, M. Pt.
 165° to 173° C.,
N-(3-N'-propionyl-N'-ethylamino-2,4,6-triiodoben-
 zoyl)-N-ethyl-β-aminopropionic acid, M. Pt.
 174° to 179° C.
N-(3-N'-propionyl-N'-methylamino-2,4,6-triiodoben-
 zoyl)-N-n-propyl-β-aminopropionic acid, M. Pt.
 187° to 193° C.
N-(3-N'-propionyl-N'-ethylamino-2,4,6-triiodoben-
 zoyl)-N-n-propyl-β-aminopropionic acid, M. Pt.
 170° to 175° C. and 210° to 215° C.,
N-(3-N'-propionyl-N'-allylamino-2,4,6-triiodoben-
 zoyl)-N-3-methoxypropyl-β-aminopropionic acid,
 M. Pt. 67° to 75° C., isomeric form M. Pt. 63° to
 74° C.,
N-(3-N'-propionyl-N'-methylamino-2,4,6-triiodo-
 benzoyl)-N-allyl-β-aminopropionic acid,
 M. Pt. 182° to 185° C.,
N-(3-N'-propionyl-N'-ethylamino-2,4,6-triiodo-
 benzoyl)-N-allyl-β-aminopropionic acid,
 M. Pt. 149° to 156° C.,
N-(3-N'-propionyl-N'-allylamino-2,4,6-triiodobenzoyl)-
 N-allyl-β-aminopropionic acid, M. Pt. 94° to 99° C.,
N-(3-N'-propionyl-N'-methylamino-2,4,6-triiodo-
 benzoyl)-N-α-furanomethyl-β-aminopropionic acid,
 M. Pt. 158° to 161° C.,
N-(3-N'-propionyl-N'-ethylamino-2,4,6-triiodo-
 benzoyl)-N-α'-furanomethyl-β-aminopropionic
 acid, M. Pt. 149° to 151° C.,
N-(3-N'-propionyl-N'-allylamino-2,4,6-triiodoben-
 zoyl)-N-α'-furanomethyl-β-aminopropionic acid,
 M. Pt. 86° to 92° C.,
N-(3-N'-propionyl-N'-methylamino-2,4,6-triiodo-
 benzoyl)-β-amino-α-methylpropionic acid, M. Pt.
 213° to 215° C.,
N-(3-N'-popionyl-N'-ethylamino-2,4,6-triiodoben-
 zoyl)-β-amino-α-methylpropionic acid, M. Pt.
 207° to 210° C.,
N-(3-N'-propionyl-N'-allylamino-2,4,6-triiodoben-
 zoyl)-β-amino-α-methylpropionic acid, M. Pt. 230°
 to 232° C.,
N-(3-N'-propionyl-N'-methylamino-2,4,6-triiodoben-
 zoyl)-N-allyl-β-amino-α-methylpropionic acid, M.
 Pt. 160° to 165° C., and
N-(3-N'-propionyl-N'-ethylamino-2,4,6-triiodoben-
 zoyl)-N-allyl-β-amino-α-methylpropionic acid,
 M. Pt. 154° to 160° C., and the sodium salts thereof.

The following examples illustrate the preparation of X-ray contrast agents according to the invention.

EXAMPLE 3

750.0 g. of N-(3-N'-methylamino-2,4,6-triiodobenzoyl)-N-n-propyl-β-amino-α-methylpropionic acid sodium salt are admixed with 157.0 g. of starch, 26.4 g. of talc and 6.6 g. of magnesium stearate. The mixture is homogenised and 940 mg. tablets are extruded from the mixture. Each of the tablets contains 750 mg. of active compound.

EXAMPLE 4

600.0 g. of N - (3-N'-acetyl-N'-methylamino-2,4,6-triiodobenzoyl) - N - isopropyl-β-amino-α-methylpropionic acid sodium salt are admixed with 163 g. of starch, 28 g. of talc and 9 g. of magnesium stearate. The mixture is homogenized and the homogenised mass is extruded into tablets of 800 mg. They have an active compound content of 600 mg.

EXAMPLE 5

1000.0 g. of N-(3-N'-acetyl-N'-ethylamino-2,4,6-triidobenzoyl)-N-isopropyl-β-amino-α-methylpropionic acid are made into a paste with 400 ml. starch paste and 20 g.

maize starch. This is granulated in a cosventional manner and dried in vacuo. The finished granulate is admixed with further amounts of 100 g. of maize starch and 5 g. of magnesium stearate and extruded into tablets having an active compound content of 500 mg.

EXAMPLE 6

500 mg. of N-(3-N'-acetyl-N'-allylamino-2,4,6-triiodobenzoyl)-N-(methyl-β-aminopropionic acid sodium salt is admixed with 300 mg. of arachis oil and 50 mg. of lecithin to form a fluid paste which is placed into gelatin capsules. These are suitable for oral administration.

Pastes for capsules or tablets can also be made in a similar manner from any of the other compounds prepared according to Examples 1 and 2.

We claim:
1. A 3-amino-2,4,6-triiodobenzoic acid derivative having the formula:

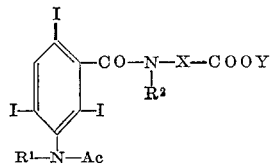

in which Ac is an acyl residue of an alkanoic acid having up to four carbon atoms, $R^1$ is selected from the group consisting of lower alkyl and alkenyl having 3 or 4 carbon atoms, $R^2$ is selected from the group consisting of hydrogen, alkyl and isoalkyl having up to four carbon atoms, alkenyl having 3 or 4 carbon atoms, ω-alkoxyalkyl having 3 or 4 carbon atoms, benzyl and α-furanomethyl, X is selected from the group consisting of methylene, ethylene, α-methylethylene and β-methylethylene and Y is selected from the group consisting of hydrogen, methyl, ethyl and a residue of a non-toxic inorganic or organic base.

2. A 3-amino-2,4,6-triiodobenzoic acid derivative according to claim 1 having the formula:

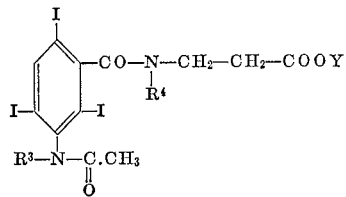

in which $R^3$ is selected from the group consisting of methyl, ethyl and allyl, $R^4$ is selected from the group consisting of methyl, ethyl, n-propyl, allyl and ε-methoxypropyl and Y is selected from the group consisting of hydrogen, methyl, ethyl and a residue of a nontoxic inorganic or organic base.

3. A 3-amino-2,4,6-triiodobenzoic acid derivative according to claim 1 having the formula

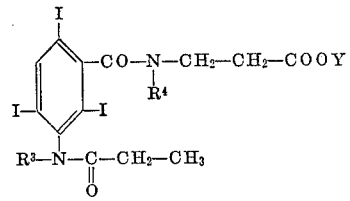

in which $R^3$ is selected from the group consisting of methyl, ethyl and allyl, $R^4$ is selected from the group consisting of methyl, ethyl, n-propyl, allyl and γ-methoxypropyl and Y is selected from the group consisting of hydrogen, methyl, ethyl and a residue of a non-toxic inorganic or organic base.

4. A 3-amino-2,4,6-triiodobenzoic acid derivative according to claim 1 having the formula

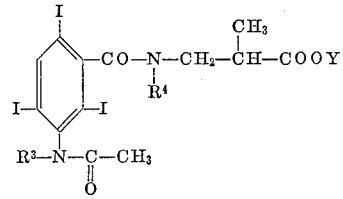

in which $R^3$ is selected from the group consisting of methyl, ethyl and allyl, $R^4$ is selected from the group consisting of methyl, ethyl, n-propyl, allyl and γ-methoxypropyl and Y is selected from the group consisting of hydrogen, methyl, ethyl and a residue of a non-toxic inorganic or organic base.

5. A 3-amino-2,4,6-triiodobenzoic acid derivative according to claim 1 having the formula

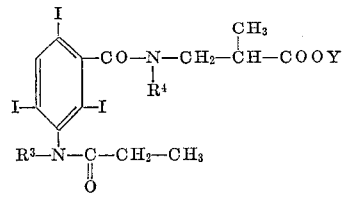

in which $R^3$ is selected from the group consisting of methyl, ethyl and allyl, $R^4$ is selected from the group consisting of methyl, ethyl, n-propyl, allyl and γ-methoxypropyl and Y is selected from the group consisting of hydrogen, methyl, ethyl and a residue of a non-toxic inorganic or organic base.

6. The compound according to claim 1 the sodium salt of N-(3-N'-acetyl-N'-methylamino-2,4,6-triiodobenzoyl)-N-allyl-β-aminopropionic acid.

7. The compound according to claim 1 the sodium salt of N-(3-N'-acetyl-N'-methylamino-2,4,6-triiodobenzoyl)-N-allyl-β-amino-α-methylpropionic acid.

8. The compound according to claim 1 the sodium salt of N-(3-N'-propionyl-N'-ethylamino-2,4,6-triiodobenzoyl)-N-3'-methoxypropyl-β-aminopropionic acid.

9. The compound according to claim 1 the sodium salt of N-(3-N'-acetyl-N'-allylamino-2,4,6-triiodobenzoyl)-N-methyl-β-aminopropionic acid.

10. The compound according to claim 1 the sodium salt of N-(3-N'-acetyl-N'-allylamino-2,4,6-triiodobenzoyl)-N-ethyl-β-aminopropionic acid.

11. The compound according to claim 1 the sodium salt of N-(3-N'-propionyl-N'-allylamino-2,4,6-triiodobenzoyl)-β-amino-α-methylpropionic acid.

References Cited

UNITED STATES PATENTS 3,334,134  8/1967  Obendorf et al.

LORRAINE A. WEINBERGER, Primary Examiner

L. ARNOLD THAXTON, Assistant Examiner

U.S. Cl. X.R.

260—347.3, 347.4, 471, 501.16, 519, 544; 424—5